(12) United States Patent
Connelly

(10) Patent No.: US 7,096,082 B1
(45) Date of Patent: Aug. 22, 2006

(54) DESIGN CONTROL DOCUMENT LINKING TEMPLATE

(75) Inventor: David G. Connelly, Ansonia, CT (US)

(73) Assignee: Methode Electronics, Inc., Carthage, IL (US)

( * ) Notice: Subject to any disclaimer, the term of this patent is extended or adjusted under 35 U.S.C. 154(b) by 505 days.

(21) Appl. No.: 10/445,327

(22) Filed: Sep. 16, 2003

Related U.S. Application Data

(60) Provisional application No. 60/382,618, filed on May 24, 2002.

(51) Int. Cl.
G06F 19/00 (2006.01)

(52) U.S. Cl. .......................... 700/97; 700/99; 700/104; 700/105; 700/108; 700/109; 700/110; 707/1; 707/10; 707/200; 707/203; 715/500; 715/503; 715/511; 705/11; 705/28; 705/29

(58) Field of Classification Search .......... 700/97–100, 700/104, 105, 106, 107, 108, 109, 110; 707/200, 707/203–10; 715/500, 503, 511; 705/11, 705/28, 29
See application file for complete search history.

(56) References Cited

U.S. PATENT DOCUMENTS

| | | | |
|---|---|---|---|
| 6,205,579 B1* | 3/2001 | Southgate | 717/173 |
| 6,341,287 B1* | 1/2002 | Sziklai et al. | 707/102 |
| 2002/0042731 A1* | 4/2002 | King et al. | 705/10 |
| 2003/0106039 A1* | 6/2003 | Rosnow et al. | 717/100 |
| 2004/0030649 A1* | 2/2004 | Nelson et al. | 705/44 |
| 2004/0117358 A1* | 6/2004 | von Kaenel et al. | 707/3 |

* cited by examiner

Primary Examiner—Ramesh Patel
(74) Attorney, Agent, or Firm—Blank Rome LLP

(57) ABSTRACT

A control document template streamlines the creation of control documents and facilitates consistent entry of data. A multi-page spreadsheet file incorporates the design and process failure mode effects analysis pages, the control plan, tools for forming the process flow diagram, the work instructions, and the packaging specifications. A macro sorts the failure mode effects analysis pages by risk priority number without overwriting the original data.

13 Claims, 13 Drawing Sheets

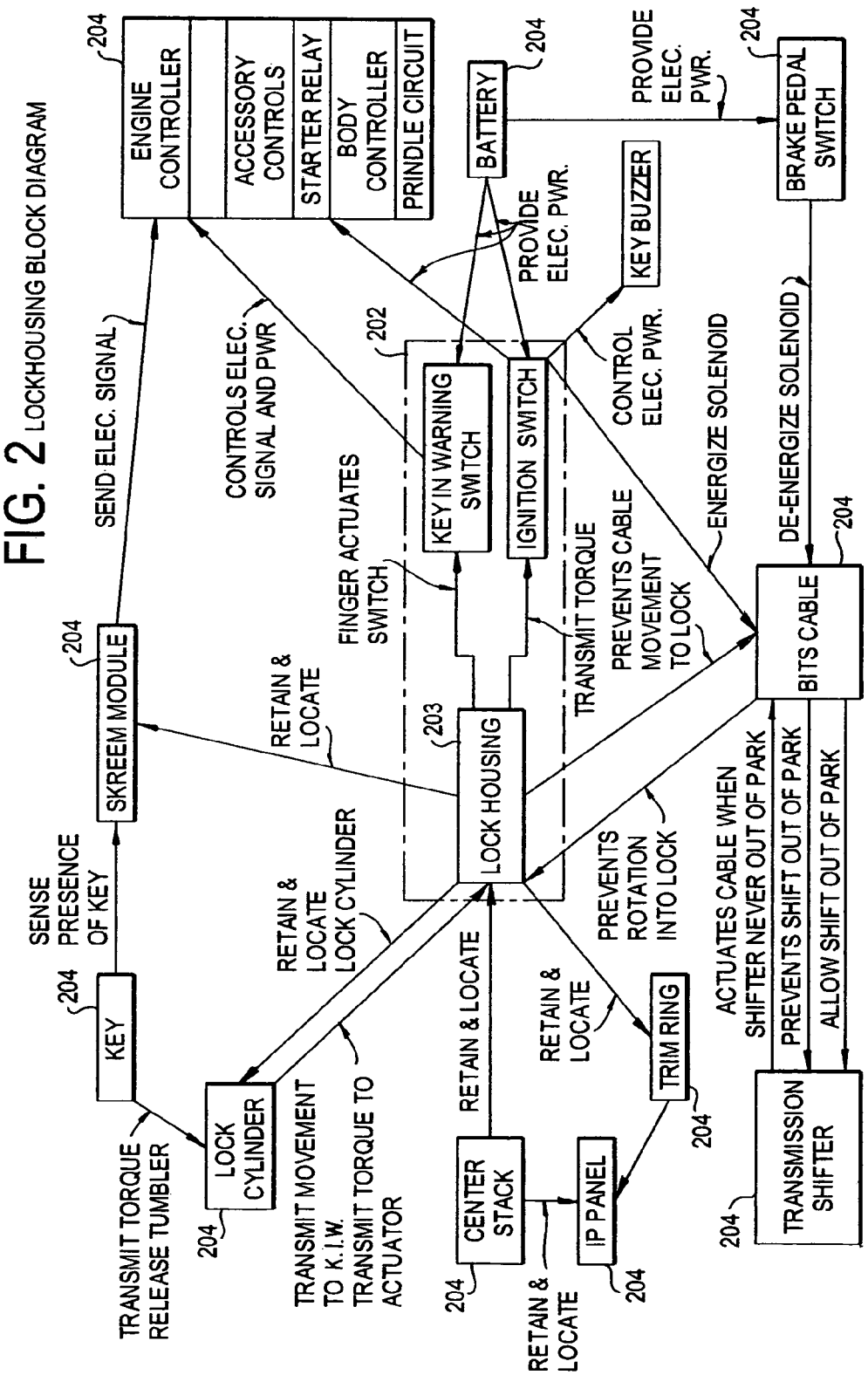

FIG. 3A

BLOCK DIAGRAM COMPONENTS FOR DESIGN
AND / OR PROCESS FMEA PREPARATION

314

| Characteristic Number | Characteristic Source | Symbol | Dimension and Tolerance | Classification | Minimum Number Required |
|---|---|---|---|---|---|
| 1 | | | | | 0 |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |

Methode Electronics, Inc.
Design FMEA Checklist

Part Number: 0
Revised: _____
Description: #Value
Prepared By: Design Engineering

| | Question | Y/N | Comment / Action Required | Person Responsible | Due Date |
|---|---|---|---|---|---|
| 1 | Was the DFMEA prepared using the Chrysler, Ford, and General Motors Potential Failure Mode and Effects Analysis (FMEA) reference manual? | Y | | | |
| 2 | Have historical campaign and warranty data been reviewed? | N | | | |
| 3 | Have similar part DFMEAs been considered? | N | | | |
| 4 | Does the DFMEA identify Special Characteristics? | Y | | | |
| 5 | Have design characteristics that affect high risk priority failure modes been identified? | Y | | | |
| 6 | Have appropriate corrective actions been assigned to high priority numbers? | | | | |
| 7 | Have appropriate corrective actions been assigned to high severity numbers? | | | | |
| 8 | Have risk priorities been revised when corrective actions have been completed and verified? | N | | | |

310

Methode Electronics, Inc.
Process FMEA Checklist

Part Number: 0
Revised: _____
Description: #Value
Prepared By: Manufacturing Engineering

| | Question | Y/N | Comment / Action Required | Person Responsible | Due Date |
|---|---|---|---|---|---|
| 1 | Was the DFMEA prepared using the Chrysler, Ford, and General Motors Potential Failure Mode and Effects Analysis (FMEA) reference manual? | Y | | | |
| 2 | Have all operations affecting fit, function, durability, governmental regulations been identified and listed sequentially? | | | | |
| 3 | Have similar part FMEAs been considered? | N | | | |
| 4 | Have historical campaign and warranty data been reviewed? | N | | | |
| 5 | Have appropriate corrective actions been planned or taken for high risk priority numbers? | | | | |
| 6 | Have appropriate corrective actions been planned or taken for high severity numbers? | | | | |
| 7 | Were risk priority numbers revised when a design change was completed? | N | | | |
| 8 | Were high severity numbers revised when a design change was completed? | N | | | |
| 9 | Do the effects consider the customer in terms of the subsequent operation, assembly, and product? | | | | |
| 10 | Was the warranty information used as an aid in developing the process FMEA? | N | | | |
| 11 | Were customer plant problems used as an aid in developing the process FMEA? | | | | |
| 12 | Have the causes been described in terms of something that can be fixed or controlled? | | | | |
| 13 | Where detection is the major factor, have provisions been made to control the cause prior to the next operation? | | | | |

DESIGN CONTROL DOCUMENT LINKING TEMPLATE

REFERENCE TO RELATED APPLICATION

The present application claims the benefit of U.S. Provisional Application No. 60/382,618, filed May 24, 2002, whose disclosure is hereby incorporated by reference in its entirety into the present disclosure.

STATEMENT OF COPYRIGHT INTEREST

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to design control documents and in particular to a template that links such design control documents into a unit.

DESCRIPTION OF RELATED ART

The traditional way to develop Control Documents in the past was that each department or working group would generate the documents for which they were responsible. Design Engineering would generate the DFMEA (Design Failure Mode Effects Analysis). Manufacturing Engineering would generate the PFMEA (Process Failure Mode Effects Analysis), Work Instructions, Packaging Specifications, and Process Flow Chart. Quality Engineering would generate the Control Plan.

However, that process resulted in the development of multiple documents. It could not readily be determined where characteristics were generated in one document and checked in another document. The creation of multiple documents led to redundant work and the possibility of entry of inconsistent information.

SUMMARY OF THE INVENTION

It is an object of the invention to develop an efficient technique for the development of design control documents.

It is another object of the invention to facilitate consistent entry of information.

To achieve the above and other objects, the present invention is directed to a design control document linking template. The template has been implemented in Microsoft Excel, but the invention is not limited to the use of any particular software package.

The concept of combining all of the documents into one file is unique. The advantage of combining the individual documents into one file gives the ability to include some "automation".

Normally, approximately 6 individuals would be generating documents of this type. The automation comes in to help and fill out the headers for the sheets. Instead of 6 people entering the data on individual sheets, a representative from a team of 3 to 4 people enters the data once and it is propagated to all the form headers. This not only saves labor but also improves the consistency of data entry. Other examples of automation will be discussed as the pages are reviewed. Another feature of the template is the ability to get real time instruction on how to enter data for a particular column of cells. Data entry instructions are contained in the column titles as notes. Moving the mouse pointer over the title drops down the instructions. Using this technique it is possible to click in the cell where data is to be entered and then move the mouse pointer over the column heading to have the instructions showing as data is being entered into the cell where the typing cursor was located.

The document index is created as the first page in the file. The file has so many worksheet tabs in it that all of the tabs do not fit on one screen. The index was provided not only to quickly take the user to tabs that are not available on the screen but also to take them directly to the cell at the beginning of the section that they are interested in. This is done through the use of 'hyperlinks'. A 'hyperlink' is like an address where an item is located. The use of hyperlinks in the index provides another functionality besides an address. If the mouse is clicked on the hyperlink—the user is taken to the location that the hyperlink specifies. This is much the same way as the World Wide Web works. Clicking on an icon or text entry can take the user to the location that a programmer specified in the software for that icon or text.

The Scope—Criteria—Checklist page is the first data worksheet page. This is where a cross-functional team identifies the product that is being worked on, the members of the team, the product family, and the risks associated with each component or sub-system of the part. The FMEA training that was given to all engineers started with the identification of the team followed closely by identifying the scope of the FMEA that is about to be developed. The first item on the sheet is a risk assessment of each component part for the overall part. The users identify the element under consideration and whether it is a high, medium or low risk from a failure standpoint. The team might base its assessment on historical data for a similar part, customer data, industry data, or competitive data for part failures. The team then decides if the element will be included in the Failure Mode Effects Analysis (FMEA) based on the rating. Element ratings of low are generally not included in the scope of a FMEA. Medium may be included and high is usually always included unless specified by a customer.

The next section is basic information about the nature of the part. The purpose of these questions is to get the team thinking about similar parts, historical quality data, and information from the production floor about how the parts have failed. The team is also asked if the customer has identified the part as having safety, significant or critical characteristics. If the answer to any of these is yes, the headers on the DFMEA and PFMEA are changed to reflect the appropriate information.

The next section of the form is where the supplier's part number and core team member information is entered. This information is also entered into several areas of the document headers on the DFMEA, PFMEA and Control Plan. The part number is also entered into the Work Instructions and Packaging Specification sheets.

The first worksheet also contains the block diagram components that can be used for the DFMEA and PFMEA block diagrams. These components can be copied, moved, have text entered, and be reshaped to facilitate the creation of the block diagrams. There is also a P-Diagram form already created that can have text inserted to identify the inputs, outputs, controls, and noise factors leading to ideal functions and error states.

The last section on this sheet is the PFMEA and DFMEA checklists. Several answers and header information are automatically filled in based on data entered and questions answered at the beginning of this sheet. If the questions are followed and answers entered into the appropriate fields, the checklist answers are changed in the form to correspond to the data entered.

The DFMEA form is the third tab in the file. The arrangement of the sheets in the file corresponds to the sequence in which the forms will be filled out by the cone team. The cross-functional team that designed the process flow chart determined the sequence. The DFMEA form is the first sheet to include instructions built into the sheet in the column headers. Moving the mouse pointer over a column header will bring up the instructions for entering data into that column.

Many of the fields in the header will have already been filled in based on information entered into the Scope—Criteria—Checklist page. A new field is the last field on the right side of the header. The PPAP standards specify that an annual review will be made on each part in production. This new field takes the newer of the Origination Date or the Revision Date and adds eleven months to give a review notification trigger date. This date gives a one-month notice to allow the preparation for the review to take place. This field, along with a field in the Control Document Database that identifies the stage of the product life cycle that the part is in, can be used to automatically prompt a specific user when a review is coming due. This type of data can be used outside the 'form' to trigger external actions. This is not currently possible with conventional documents but should be kept in mind when designing new documents. These capabilities are touched on in the last section of the report where the future of document generation and control are covered. The form as it shows up on the sheet is very similar to many FMEA manuals and training materials. There are several differences made for specific reasons. The first difference is the review date previously mentioned. A second difference is the addition of the fields used to identify if the part is safety related and contains critical or significant characteristics. The original form does not make a provision for indicating safety-related arts except through the use of symbols incorporated into the part number. This type of nomenclature prevents the use of monitoring programs that can extract selected information from a form and use it to trigger external events or provide data for summary or sorts. The only way that this is possible is if the symbol is entered into a different field from the part number. A part can be safety related even if no significant or critical characteristics are specified for that part. This makes the addition of these fields a means of identifying these parts that was not previously allowed for in the standard forms.

The third difference is the addition of two hidden columns. The original form shows that entries are made in the Item/Function column that might have three or four entries in the Potential Failure Mode column. The same holds true of the Potential Failure Mode column. There might be several entries under Potential Effects or Causes column for each Potential Failure Mode. The conflict caused here is by the requirement to sort the data by RPN (risk priority number). Existing sort capability will lose the Item/Function and Potential Failure Mode for each RPN number that does not have an entry in that row. The hidden columns allow the Item/Function and Potential Failure Mode to be replicated in each row until the item is changed. This allows each RPN number to have the exact Item/Function and Potential Failure Mode that was associated with the original data after the sort is performed. The key reason that this is critical is that some data may be deleted after the sort takes place. This is the reason that this sheet is considered the original data sheet. The macro used to perform the sort not only protects the integrity of the original data but retains the information from the original data even if the user did not specifically make an entry in that row.

Severity, Occurrence and Detection multiplied together constitute the RPN (Risk Priority Number). This number gives an indication of how much attention the item warrants. The maximum value that can be attained is one thousand. The higher the number, the more attention should be made to addressing the potential failures. The supplier establishes standards to be used as a starting point. The main reason for this is that an individual auditor will have his own interpretation of what is a 'low' RPN number. The function of establishing a consistent minimum serves to answer that question of what is 'low' from our standpoint and how do we assign resources to address 'high' RPN numbers. The template has several (adjustable) checks that will change the color and shading in the Recommended Actions and Responsibility & Target Completion Date columns. Changing the criteria under conditional formatting for the cells makes adjustments to the thresholds. The initial thought is that criteria changing a cell characteristic in the Recommended Action column would 'require' corrective action where a cell color or shading change in the Responsibility column would mean "consider" a change (not required).

The DFMEA RPN sort is essentially a blank page in the template. The macro (programmed set of instructions to the worksheet) has been built into the DFMEA page. There is a button on the bottom of the DFMEA page that is identified as "RUN". When this button is depressed with the mouse button, several events are started into motion. The first is that the DFMEA page is highlighted. The highlighting includes all elements of the page including the two graphics (supplier's logo and Proprietary Information Stamp). The second thing that happens is that the spreadsheet gets a copy command for the data that is highlighted. The next event is to change the page of the spreadsheet that the macro is working on to the DFMEA RPN Sort page. The macro does a "paste special" to the page and just copies the format of the page the first time.

The next element is to "paste special" the values from the DFMEA. The macro then highlights the body of the FMEA, performs a sort on the RPN column, using descending values, and makes the hidden columns from the first page visible. The end result is a FMEA form with sorted RPN numbers. The form can be clarified by deleting any zero or null RPN rows leaving just the relevant data. This is acceptable because the first DFMEA for serves as the original data. That data remains unaffected by the copy.

The PFMEA form is essentially the same as the DFMEA form. The major differences are that the Initiator is automatically identified as the Manufacturing Engineer from the Core Team. Some other features common to both forms that were not mentioned previously are:

RPN numbers are only calculated if the result will be greater than zero.

A revision history is available at the bottom of the DFMEA, PFMEA and Control Plan, Entry of a specific "class" (SP, CC, etc) will automatically cause a corrective action cell to change characteristics (color or shading). This indicates that it should be included in the Special Characteristics Sheet.

The PFMEA RPN Sort page works exactly the same as the DFMEA RPN Sort page.

The Characteristic Sheet provides an important function not only from an automation standpoint but also for keeping the sequence of the process correct. The critical and significant characteristics that were generated from Customer specification and drawing, Design FMEA, and the Process FMEA are entered into the Characteristic Sheet. Each characteristic has already been given a "Characteristic Number". This number is used to identify the characteristic in the Control Plan. Every characteristic entered on this sheet is automatically entered on the Control Plan. This is why the sequence of the process is important. if the Control Plan is filled out prior to having the DFMEA, PFMEA and Customer characteristics entered, data that has been entered into the Control Plan will be overwritten when the characteristics are entered on this sheet. The Characteristic Source tells where the characteristic was obtained. The possible choices are available in a drop down window. Right clicking the mouse in the cell where the data is to be entered presents a task list. The user should go down and left click on "Select from list". The list will appear and the user can left click on the right selection. This data is automatically entered into the cell.

The "Symbol" cell can show the symbol designated by the customer for the characteristic (if any). This is entered using a symbol font in which keyboard characters are mapped to the desired symbols. The font can be supplied along with the control document template and is installed on the user's computer in the normal way as dictated by the operating system run on that computer.

This data could be used at some future date if and when customers require symbols within the documentation for their parts. The "Dimension and Tolerance" field also gets transferred automatically to the Control Plan. The last field "Classification" is based on the Methode abbreviations used within the FMEA forms to trigger the corrective action indicators. The easiest way to use this column is to position the cursor in the cell where the data is to be entered and then move the mouse over the column heading. This will open an instruction box where the acceptable classifications are listed. The proper classification can then be typed in from the list.

The Severity—Occurrence—Detection Tables are contained within the file to make referencing the tables easy for the user. The tables also provide a record of the version of the Standards that the file was created under. The current tables are from the Third Edition of the FMEA Manual. The other advantage of re-creating the tables is that they can be modified to include Methode specific criteria from MAC charts, complaint data and other sources that may use different measurements from those provided in the original tables.

The Control Plan has several unique features. The first feature is the "radio buttons" to indicate whether the Control Plan is for Prototype, Pre-Launch, or Production. Clicking the mouse in any one button turns the previously indicated button off.

The automatic entry of the special characteristics was already mentioned. The next unique feature is two hidden columns. These two columns follow the "Evaluation/Measurement Technique". The purpose of the columns is to allow hyperlinks to be added that could take the use to Calibration data and Gage R&R data studies (if available) for the measuring equipment indicated. This makes it easy to answer audit questions, as all the information is available in one location.

Another feature of combining all the forms into one file is demonstrated on the Revision History for the DFMEA, PFMEA and Control Plan. Each of these documents references the Process Flow Diagram Revision Number. Combining all the forms into one file makes the revision number of the Flow Diagram available under one of the worksheet tabs.

The Process Flow Diagram is inserted into a worksheet as a "picture". The picture can be in any suitable format, although it is preferred to use either a format such as JPEG that is widely supported or a format such as Adobe Acrobat® PDF for which a viewer is freely distributed.

If the image format used cannot be imported by the spreadsheet software used (e.g., Excel), that means that the Process Flow Chart cannot become a part of the Excel file but has to be connected to it by means of a hyper-link. If the image is cut and pasted from its originating software into the spreadsheet, the hyperlink is not required, but the resulting file may be large. The tradeoff between ease of use and file size may be different for different customers.

The Work Instruction sheet contains templates for Cell Work Instructions and Non-Cell Work Instructions. The addition of the part number to the forms has been automated but little else. The user can delete the work instruction template that is not being used in the file.

The Packaging Specifications Sheet contains all six commonly used templates. The part number is automatically entered base on the input from the Scope—Criteria—Checklist Sheet. The unused templates can be deleted once the appropriate Packaging Specification has been completed.

The software template guides the design team through the generation of the required documentation on a new or revised product. The template provides features previously available only in expensive relational databases in an inexpensive, common software product. It is compliant with all known current specifications for the product families produced and provides some features that are required but not available in other software packages.

Customers have requested that their control documents (DFMEA—Design Failure Mode Effects Analysis; PFMEA—Process Failure Mode Effect Analysis, and Control Plan) have significant and critical characteristics linked through the documentation. The present invention, in the disclosed embodiment, generates a clear linkage between characteristics that are identified in the DFMEA and PFMEA to ensure that they are addressed in the control plan.

The present invention has the unique capability to be able to sort information in the body of the text by up to three criteria. The capability is a requirement of the Ford Q1 specification. No other known software packages have exhibited that capability to date.

The template can combine previously separate documents into one file.

Automatic identification and differentiation between failure modes that require corrective action should have such actions considered.

Variations can be used to import existing control documentation to the template for analysis and corrective actions by the core team, expansion to subassemblies and component parts rather than just finished products, expansion to cover purchased parts (documentation required of suppliers).

Another feature of the template is the assistance provided for the engineer(s) through the identification of corrective actions on characteristics that met certain criteria. The means of measuring the risk that a characteristic has is outlined in the AIAG (Automotive Industry Action Group) FMEA (Failure Mode Effects Analysis) Manual. It consists of three numbers, each ranging from zero to ten. Severity is a measure of how bad things are when a defect occurs (1—hardly noticeable to 10—people could get hurt or regulations violated). Occurrence measures how often the defect happens. Detection measures how effective are you at detecting (or preventing) the defect. The product of Severity and Occurrence is called the Risk Priority Pattern—it represents the risk to the customer. The product of all three is known as the Risk Priority Number and is usually used to rank the importance of each element. The template has the unique ability to sort the PFMEA and DFMEA using three criteria and creating a new "sorted" FMEA that shows the preferred priority of implementing corrective actions. Color-coding is also used to identify marginal cases where corrective action should be considered.

The template is only one part of a larger vision that completely integrates the design documentation from input from the customer up front to feedback from warranty information. The system is closed-loop and continuous. The engine that drives it is the corrective action system. It turns the control documentation from pieces of paper into living, dynamic "tools".

Unique features of various embodiments of the present invention include:

1. The combining of all documents relating to a specific part into one file.

2. Insuring uniformity between documents by linking all the documents to a central source of data.

3. Reduction of clerical work by using links.

4. The ability of the FMEA(s) to assist in the decision on corrective action through the color-coding in the "Recommended Action" and "Responsibility . . . " columns.

5. Identification and tracking between documents of characteristics that require tracking.

6. The ability of the template to sort the data according to three criteria and rearrange the data in a pareto type analysis while maintaining the integrity of the original data.

7. The "intelligent" selection of which RPN value to use when the data is sorted (latest RPN).

8. The ability to use the macro multiple times to evaluate different scenarios.

9. The ability to change the template into a form that enters data into a relational database at some time in the future.

10. Allowance of different revision levels of individual documents within one file.

11. The incorporation of the process flow chart into the file eliminating the need for a separate "viewer". This also makes the file complete and independent of any external links. (The file can be e-mailed and have all information contained within it.)

12. The addition of line numbers to assist in locating data in the original document after it is sorted.

13. The use of the Risk Priority Pattern (RPP) as a factor in the sorted data and as a variable in the worksheets.

BRIEF DESCRIPTION OF THE DRAWINGS

A preferred embodiment will be disclosed in detail with reference to the drawings, in which:

FIG. 1 shows

FIG. 2 shows a functional block diagram of the component for which the control documents are to be developed;

FIGS. 3A–3C show a scope—criteria—checklists sheet;

FIGS. 4A and 4B show a DFMEA page;

FIGS. 5A and 5B show a PFMEA page;

DETAILED DESCRIPTION OF THE PREFERRED EMBODIMENT

Figure 1A:
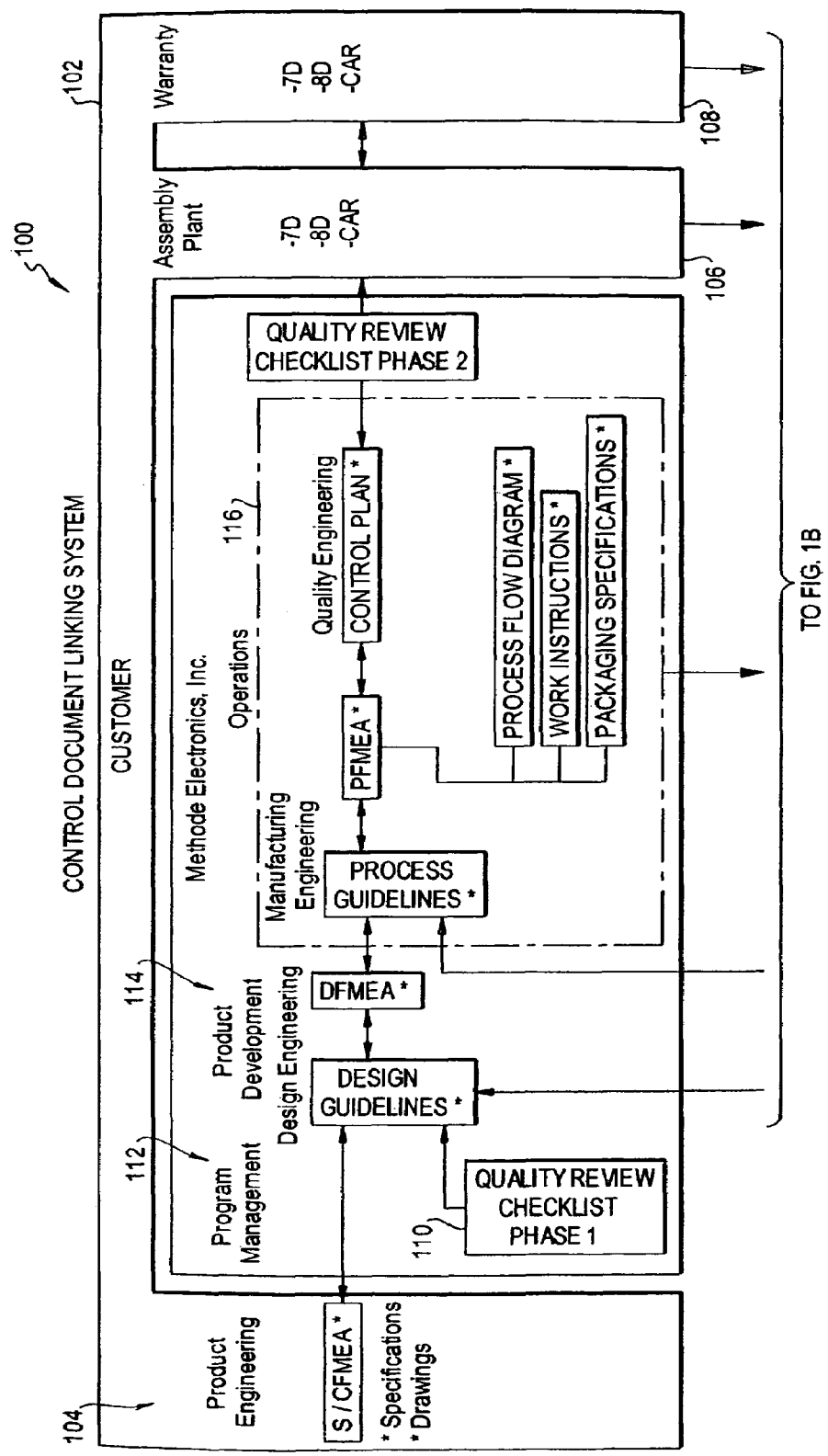
FIGS. 1A and 1B show a block diagram of the control document linking system.

A preferred embodiment of the present invention will be set forth in detail with reference to the drawings, in which like reference numerals refer to like elements throughout.

Figure 1B:
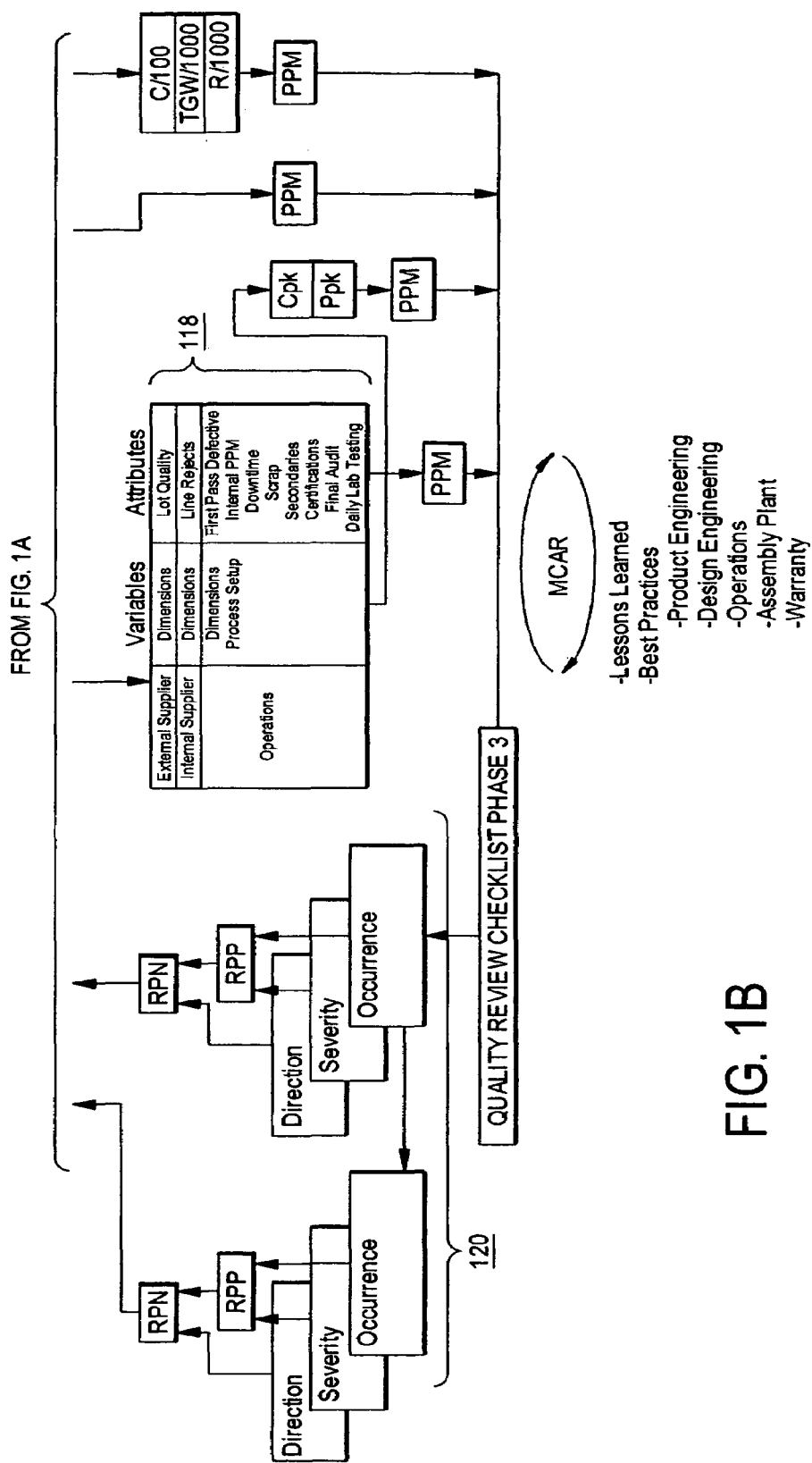

FIGS. 1A and 1B show a high-level block diagram of a control document linking system according to the preferred embodiment. The customer for whom the part is being developed is shown as 102, including product engineering 104, the assembly plant 106, and the warranty department 108. Those components are all important because of the flow of information. The company developing the part for the customer is shown as 110, including program management 114, product development 114, and operations 116. Information from external suppliers, internal suppliers and operations is contained in MAC charts (Methode attribute charts) 118, while failure information from the MAC charts and from the assembly plant 106 and the warranty department 108 is included in FMEA tables 120. That information is input to product development 114 and operations 116 to formulate the control documents in the manner to be described below.

The abbreviations used in FIGS. 1A and 1B and elsewhere have the following meaning:

| | |
|---|---|
| AIAG | Automotive Industry Action Group |
| CC | Customer Designated Critical Characteristic |
| C/100 | Conditions per 100 Vehicles |
| DFMEA | Design Mode Failure Effects Analysis |
| FMEA | Failure Mode Effects Analysis |
| HIC | High Impact Characteristic |
| MAC Charts | Methode Attribute Charts |
| MCAR | Methode Corrective Action System |
| MVP | Methode Variable Point |
| PFMEA | Process Failure Mode Effects Analysis |
| R/1000 | Rejects per 1,000 Vehicles |
| RPN | Risk Priority Number = Severity × Occurrence × Detection |
| RPP | Risk Priority Pattern = Severity × Occurrence |
| SC | Customer Designated Significant Characteristic |
| S/CFMEA | System/Concept Failure Mode Effects Analysis |
| TGW/1000 | Things Gone Wrong per 1,000 Vehicles |

The development of a part starts with a functional block diagram. The functional block diagram is a graphically based representation of the interaction between the product being manufactured and the system where the part will be installed. An illustrative example is shown in FIG. 2. The block diagram is best accomplished with the participation of the customer. This provides a clear, complete understanding of what the part does and how it interfaces with the entire system.

The Block Diagram is composed of boxes and arrows. The boxes represent component parts, subassemblies and systems. The arrows represent the functions that occur between the boxes.

The block diagram represents the component 202 supplied by the supplier (inside the dotted line) and components 203 thereof. The boxes 204 outside the dotted line represent systems or subsystems in the vehicle with which the part interacts. Each arrow represents a function that takes place between the components. Each function can fail in several ways (loss of function, too much or too little function, intermittent function, or unexpected function). These potential failure modes should be addressed in the Design and/or Process FMEA'S.

The FMEA's used in the preferred embodiment are function based. They start with the function and can drill down to the component parts as the root cause for a failure. There may be specific exceptions when they are specified by a customer.

Function is described by an action verb and a measurable noun. There are three types of functions that may be included in a FMEA. Task Functions are the single most important reason for the existence of the system. Supporting Functions are "sub" functions necessary in order for the primary function to be performed. Enhancing Functions are ones that enhance the product or improve customer satisfaction but are not needed to perform the primary function.

Figure 3A:
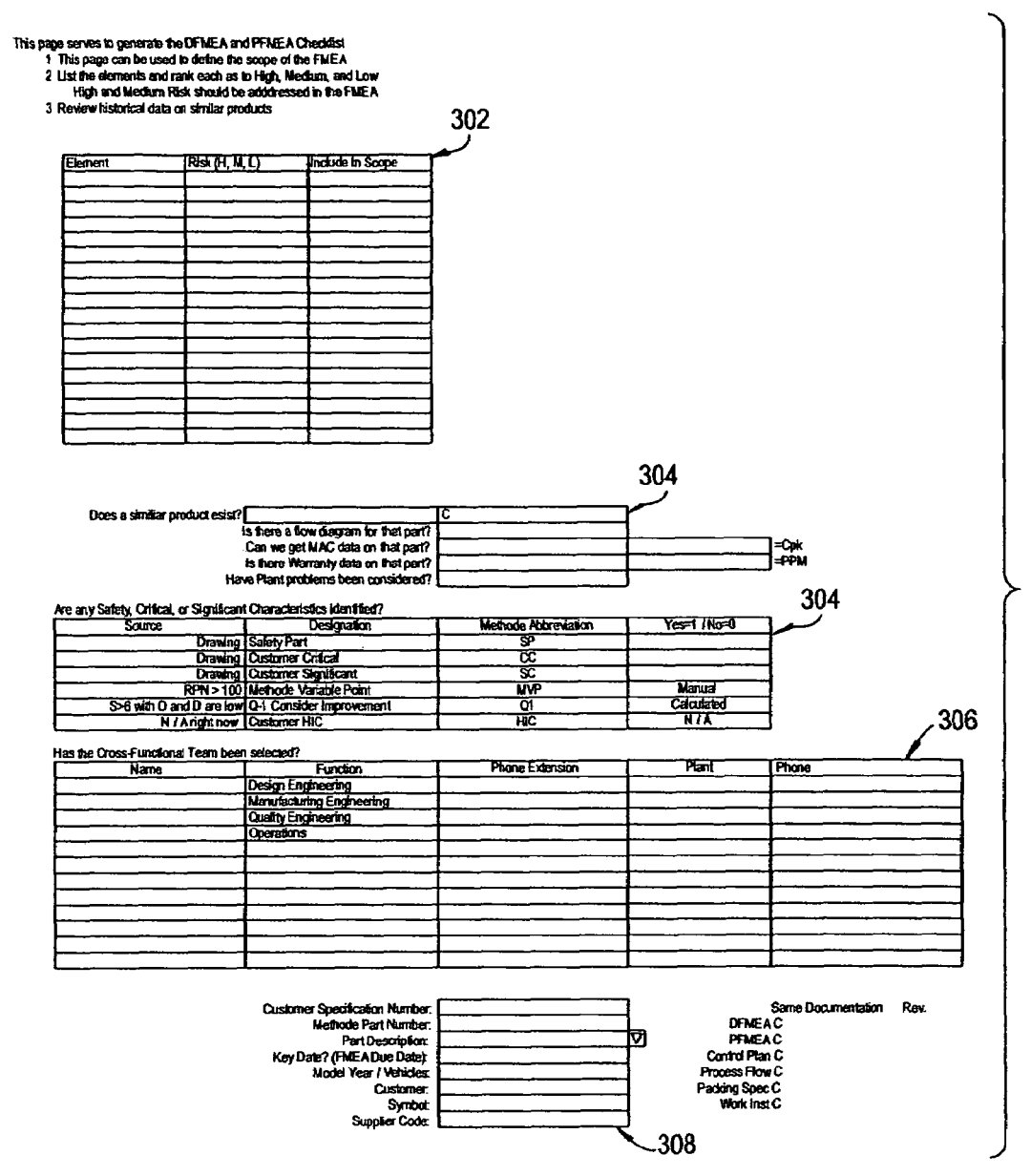
Figure 3B:

The Scope—Criteria—Checklists sheet should be filled out by the core team. Several important pieces of information are contained in this sheet. The sheet is shown in FIGS. 3A–3C.

§ The element review defines all the elements of the part and defines the risk associated with each element. The team then makes a decision, based on risk, whether the element is included in the scope of the FMEA's. This is primarily to be able to answer questions from the customer as to why certain elements are not covered in the FMEA. This is done in the element-risk-scope table 302 of FIG. 3A.

§ The identification of similar part numbers in the table 304 of FIG. 3A will give the team a starting point to perform the Quality Review Checklist. This process reviews the similar part for chronic problems and known design or process issues. These issues can then be visited by the team to see if they can be eliminated in the new part. Since the inputs to the Quality Review come from many different sources, a profile of the part future can be developed based on the history of a similar part.

§ The core team is identified and all contact information is captured in one location 306 of FIG. 3A.

§ The specific information concerning the part is spelled out in the area 308 of FIG. 3A. This information is the basis for the headers of all the control documents.

§ There is a location to enter any identical part numbers. There are several occasions where one instruction will cover several part numbers. This identifies similar part numbers to give the user an idea of what other parts might change if a change is made to this part.

§ Information is automatically input to the DFMEA and PFMEA PPAP checklists (starting at cell P100—shown in FIG. 3C as 310 and 312). These answers are based on the compliance of the template to AIAG, Q1, and Methode internal standards and procedures.

§ There is a template for a P-diagram located near the top of the sheet to the right (FIG. 3B, element 314). This is not currently a requirement. The template was added to facilitate its use and incorporate it into the file. If it does become a requirement, there should be a future enhancement to the template to put it on its own tab or incorporate it into the block diagram sheet.

Figure 4A:
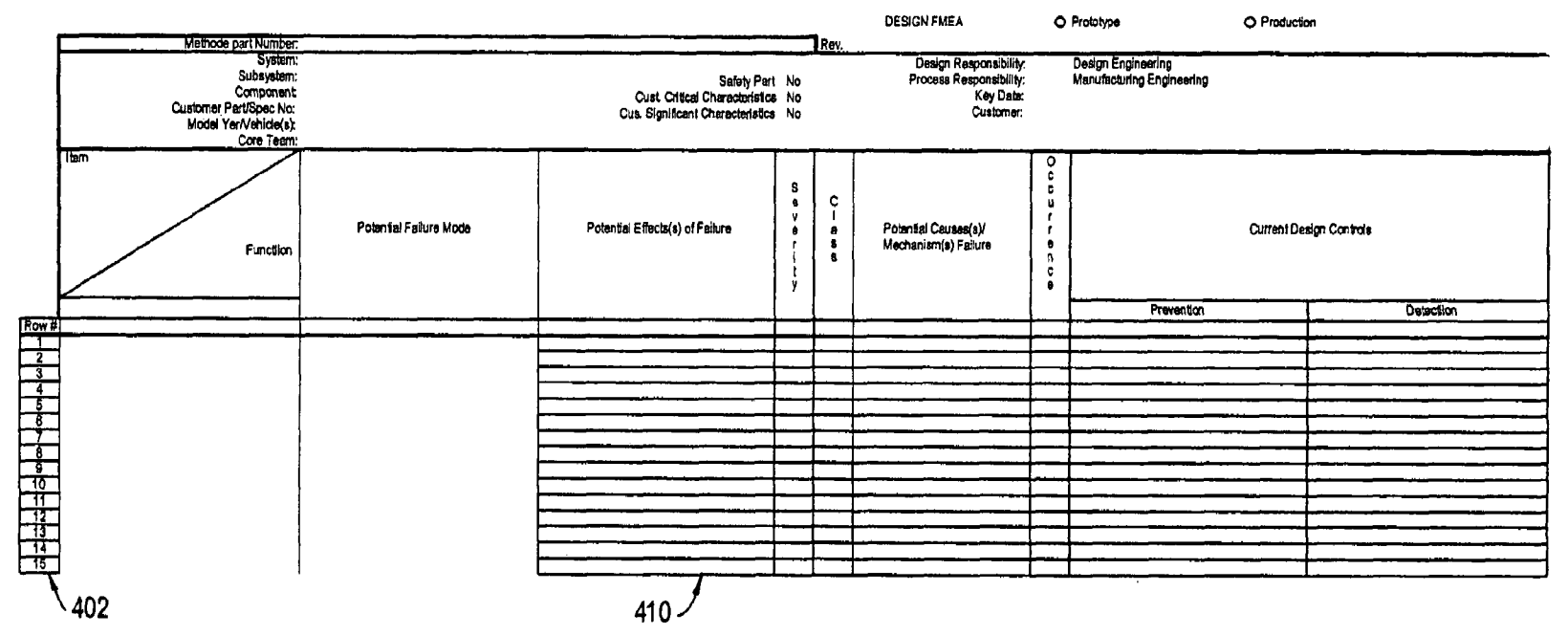
Figure 4B:
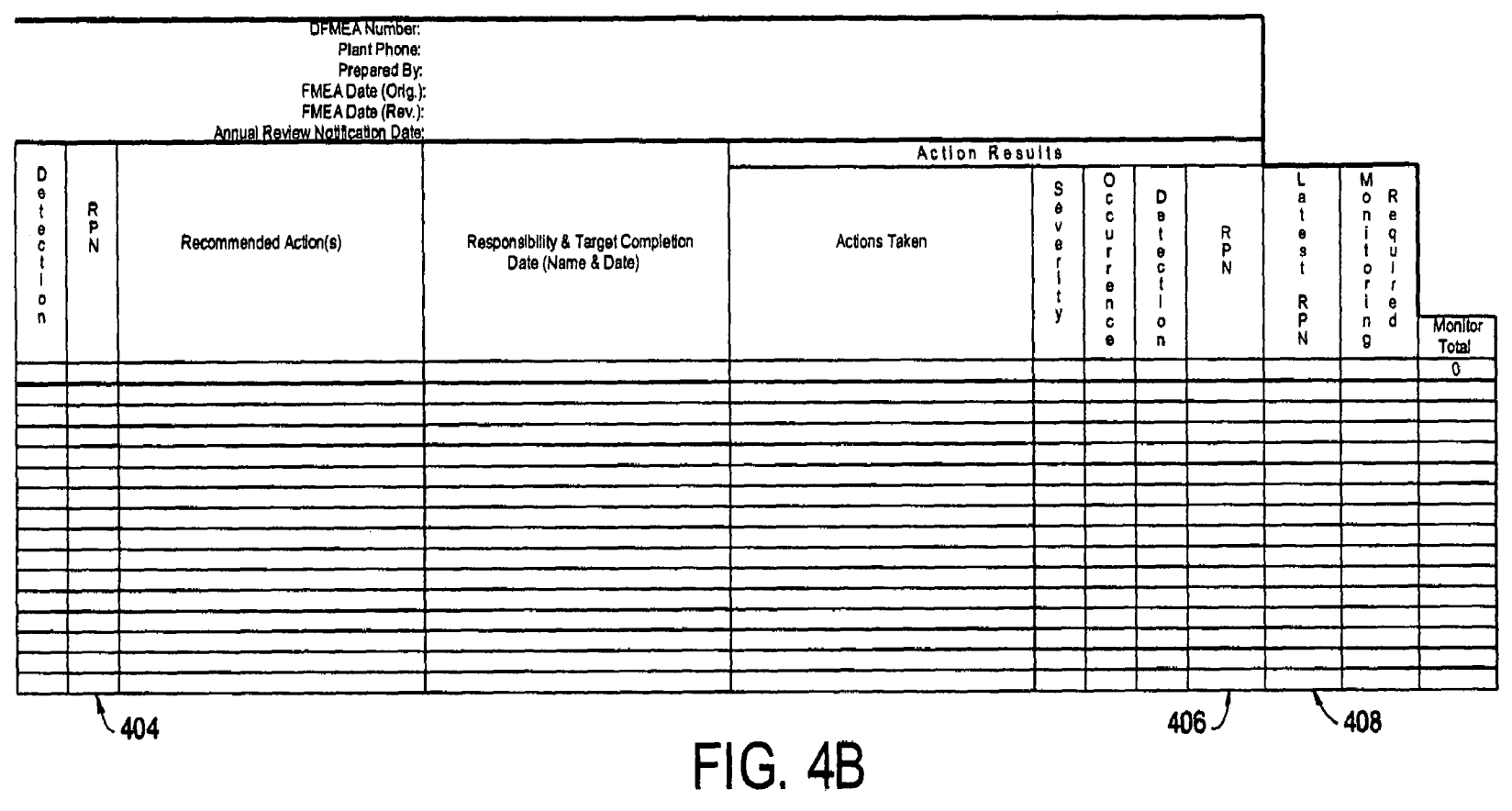

The Design FMEA (Failure Mode Effects Analysis) is created by the design engineer and will be explained with reference to FIGS. 4A and 4B. It specifies all the ways that design can contribute to failures. The template uses the basic form as outlined in traditional FMEA manuals with several exceptions. The first exception is the inclusion of line numbers 402 for each row in the spreadsheet. The line numbers were added at the suggestion of an engineer experimenting with the template. He liked the sort feature but had trouble going from the sorted data and relating it to a location on the original FMEA. The line numbers were added to allow direct translation of sorted data to a specific location on the original FMEA. This becomes more important later as data changed in the sorted FMEA does not affect the original data in any way.

Why it was done is simple. The original FMEA is considered a controlled document. Changes to the controlled document must be reviewed and approved by the source. Changes to the original data are not allowed based on experimental changes on the sorted data.

The second change is the inclusion of hidden columns. The hidden columns are necessary for the sorted data. A typical FMEA has one entry in the Item/Function column. This may be the only entry for many lines as failure modes and effects are examined. The hidden columns repeat the original information until it changes. The changed data is then repeated until another change takes place. When the data is sorted, the hidden columns are exposed and the "incomplete" columns are deleted. This results in a completely filled out row for each entry in the sorted data. This way it doesn't matter if adjacent rows are separated by the sort. Complete data is captured for each row. Great care was taken to be able to get a FMEA Manual like print out if requested by a customer. The macro defines the original print area as the entire FMEA body. The user can re-define that to exclude the row numbers and latest RPN and monitoring columns. This results in a print out that closely resembles the model in the FMEA Manual.

A second type of hidden column is one that calculates the Risk Priority Pattern. This is done to allow the product of Severity times Occurrence to occur in one cell. The sort criterion uses a column identification technique so the RPP number is put into a column by itself. It is hidden because it is not shown in the FMEA Manual. The other hidden column contains an "end of text" marker. This marker is used by the macro to help in finding the end of the text file. This is necessary since each FMEA can be a different length. The macro needs to find the end of each file for the copy, setting print area, and defining the range for the sort.

Three other columns appear in the template that do not appear in the FMEA Manual. The first is one that determines which RPN to use in the sort. There can be two RPN numbers. The first, shown in column 404, is the original RPN based on initial conditions. The second RPN, shown in column 406, is put in after corrective actions are completed and the results can be evaluated. This column tests to see if there is an entry in the second RPN column. If there is, it is transferred to the "latest RPN" column 408. If there is no second entry, the first entry is put into the latest RPN column. The sort (based on RPN) is done on this column. The last two columns have to do with the identification and tracking of significant and critical characteristics. The first column determines if a characteristic has to be tracked. This is done by "reading" the class column 410. If an entry of "SC", "CC", "MVP", "MSC", or "MCC" is found in the class column, the row is flagged for tracking. "YES" is entered into the first column and "1" is is entered into the second column. The last column that has the "1"'s counted and totaled at the top of the column. The total of the DFMEA count and the PFMEA count is shown on the Characteristic Sheet as the minimum number of tracked characteristics that need to be identified. The other unique feature of the DFMEA (PFMEA, and Control Plan) in the template is the addition of a review notification date. The PPAP process requires an annual review of the documentation. The review notification date looks at the origination and revision dates, selects the latest one and adds eleven months to that date to identify when the document should be prepared for review. The review notification date is different for each of the control documents as each can have a different origination and/or revision date. The template was set up so that the fields are located in the header and are therefore always in the same location. A possible future enhancement (when a relational database is available) would be to create a table of review dates and provide an automatic notification to the core team.

Specific procedures need to be followed when an existing FMEA is copied into the DFMEA or PFMEA form. Failure to follow these instructions could cause the copy process to overwrite formulas in the hidden columns.

1. Compare the length of the "old" FMEA to the template form length. If more lines are needed, they should be inserted in the body of the text (past line 2 in the line number column). The row above the inserted rows should be highlighted and copied into the newly inserted rows. This will duplicate all the formulas to the newly inserted rows. The success of this step can be judged very quickly by examining the row number column. The numbers should be in order and continuous if the formula copy was successful.

2. Highlight (from the bottom up) the first row—Item/Function.—Copy.

3. Locate the cursor in the first row of the Item/Function column.—Paste.

4. Repeat for Potential Failure Mode.

5. Repeat for Potential Effects of Failure.

6. Repeat for Severity. (Note: every cell that has an entry in Potential Effects of Failure should have a severity associated with it. The sorted data will need an entry in each row.)

7. Potential Causes/Mechanism Failure and Occurrence can be copied together as there is no hidden column between them.

8. If the "old" FMEA was made under Revision 2 or earlier of the FMEA Manual, copy the Current Design Controls column into the Current Design Controls—Detection column. This means that Current Design Controls and Detection columns can be copied together.

9. The next columns to be copied are Recommended Actions, Responsibility & Target Completion Date, Actions Taken, Severity, Occurrence, and Detection. These six (6) columns can be copied in together provided the "old" FMEA has data entered in these columns. (Note: Copying into the Recommended Action column overwrites a formula that writes out the template recommendation for corrective action. The FMEA Manual requires that a failure mode that is not severe and has no corrective action required/planned has "None" entered in this column. The template does this if the formula is not overwritten. If it is overwritten, the template recommendation is still captured by the Class entry made by the template.

10. Empty rows should be deleted from the completed form.

11. Import is complete except for manual entries.

Manual input to the DFMEA header includes the following steps:

1. The customer specification level that the DFMEA currently covers. (It is possible to have different documents at different revision levels if a revision is being implemented. This is the reason that the revision level that the document covers was made to be a manual input. The revision levels from all the documents are collected on the Scope—Criteria—Checklist page next to the part specific information to enable a one stop location to review all the document revision levels.

2. Radio buttons to indicate the type of DFMEA (prototype or production).

3. FMEA origination and revision dates. These are unique to the document and could not be put in the header information automatically.

4. The System, Subsystem, and Component numbers used on Ford parts are not automatic. If they are not identified in the customer specification, they can be looked up in the Ford Corporate Product Systems Classification handbook.

The DFMEA sort macro is initiated by clicking the mouse on the button located at the bottom of the DFMEA sheet. Before the macro is run, all blank columns should be deleted. This eliminates blank rows from the sorted data. The sequence of events that takes place while the macro is executing is:

§ The cursor is placed in row one of column AA.

§ The cursor is incremented one row at a time until the end of file marker is found.

§ The area from the end of file marker to cell A1 is selected for a copy

§ The cursor is moved to cell A1 on the DFMEA RPN Sort sheet.

§ A "paste special"—"formats" is executed. This is done to insure all cells are sized properly. Since some columns are deleted after the data is pasted the cells will not align properly after the macro is run several times. This format paste overcomes that problem.

§ A "paste special"—"values" is executed. This is done to eliminate any formula links to the DFMEA page. The information in the sorted sheet is now completely independent from the original data.

§ The end of file is located again to set the print area. The print area is defined as the text body only. The header was previously defined as "rows repeated at the top".

§ The original data file has the print area defined in the same way by the macro.

§ The sort sheet has the data sorted according to 1. Severity 2. Severity X Occurrence (RPP) and 3. Severity X Occurrence X Detection (RPN). This criterion is specified in the Ford Q1 Standard and is compliant with the intent of the AIAG FMEA Manual.

§ The title of the sheet is changed to read "Sorted Design FMEA".

§ The cursor on the original data file is returned to cell A1.

§ The cursor is moved back to the sorted data sheet.

The file is saved as a shared file when it is put into a predetermined folder or directory (e.g., the I:\Design Control Documents directory). If the FMEA macro is run after file sharing is turned on, the colors that were used to designate corrective action will not be transferred to the sort sheet. The macro must be run while file sharing is turned off.

Figure 5A:
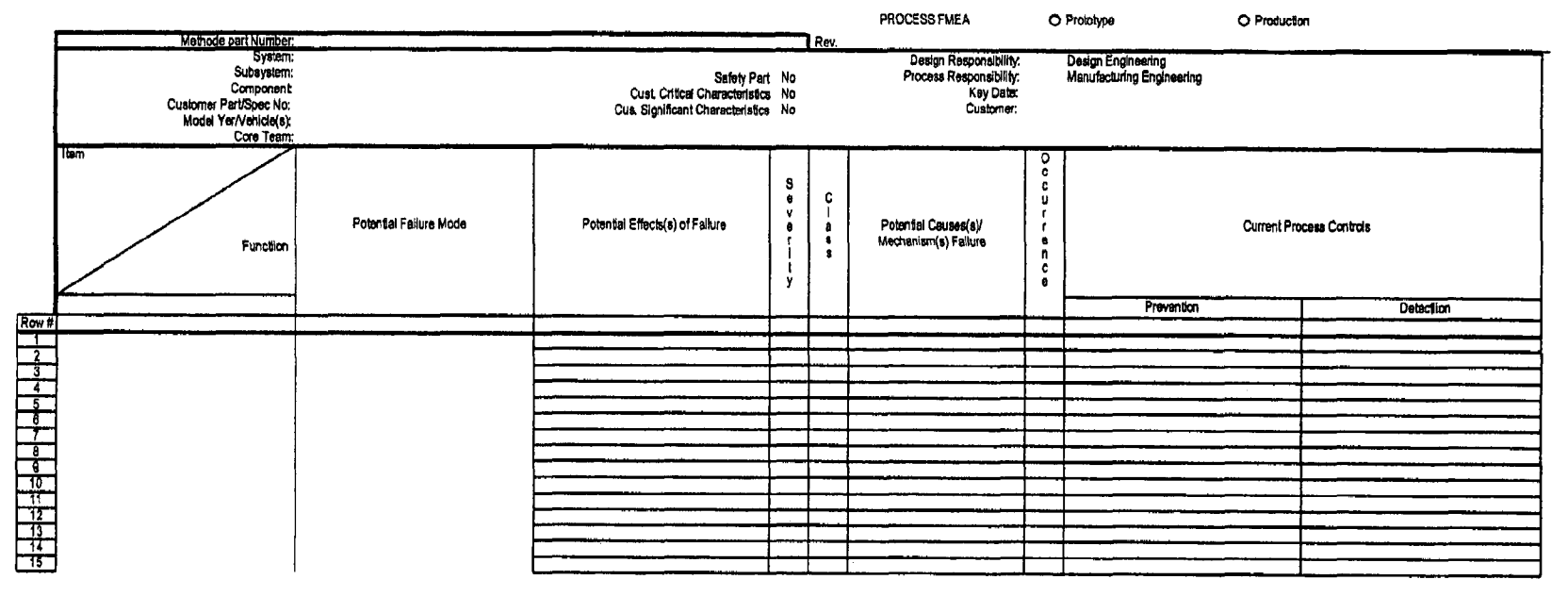
Figure 5B:
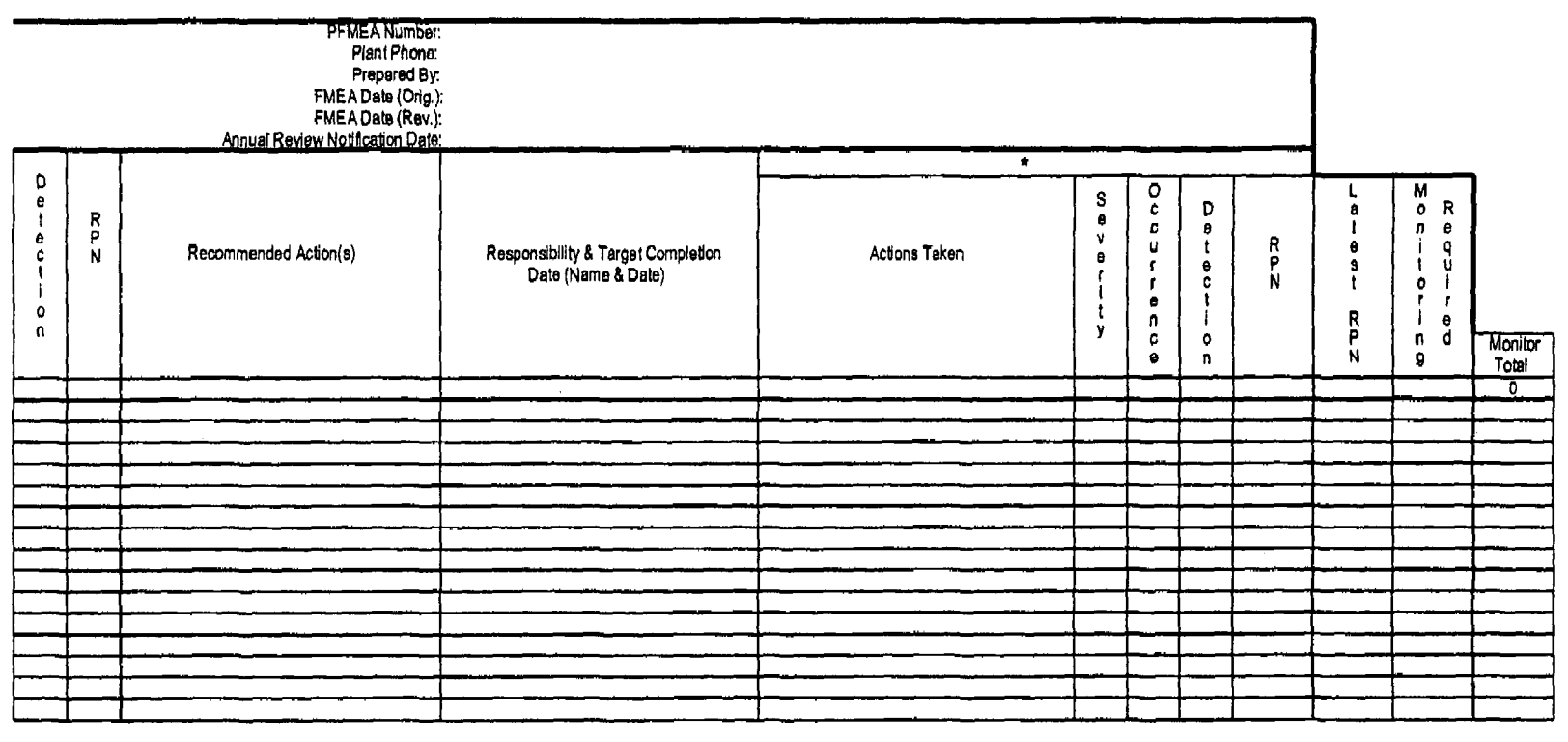

The Process FMEA is generated by the Manufacturing Engineering function and will be explained with reference to FIGS. 5A and 5B. It is the failure mode effects analysis for the process. Significant or critical characteristics may not be in both FMEA documents. If a characteristic is strictly design related it might only appear in the design FMEA. If it is strictly process related it might only appear in the process FMEA. All significant and critical characteristics must show up in the Control Plan.

The template treats the PFMEA and the DFMEA in exactly the same way. The same holds true for the PFMEA RPN sort. It is identical except for the sheets that it works from and to.

The class designations are unique for the internal characteristics. PR, RR, PC, and RC are automatically determined by the template and entered into the class column. These designations are designed to assist the engineers in deciding when corrective actions are necessary or should be considered. They are based on an internal policy and have the criteria built into formulas in the template. The definitions explained are:

1. PR—Risk Priority Pattern (RPP) violation—Corrective action is required.

2. RR—Risk Priority Number (RPN) violation—Corrective action is required.

3. PC—Risk Priority Pattern marginal—Consider corrective action

4. RC—Risk Priority Number marginal—Consider corrective action

Figure 6:
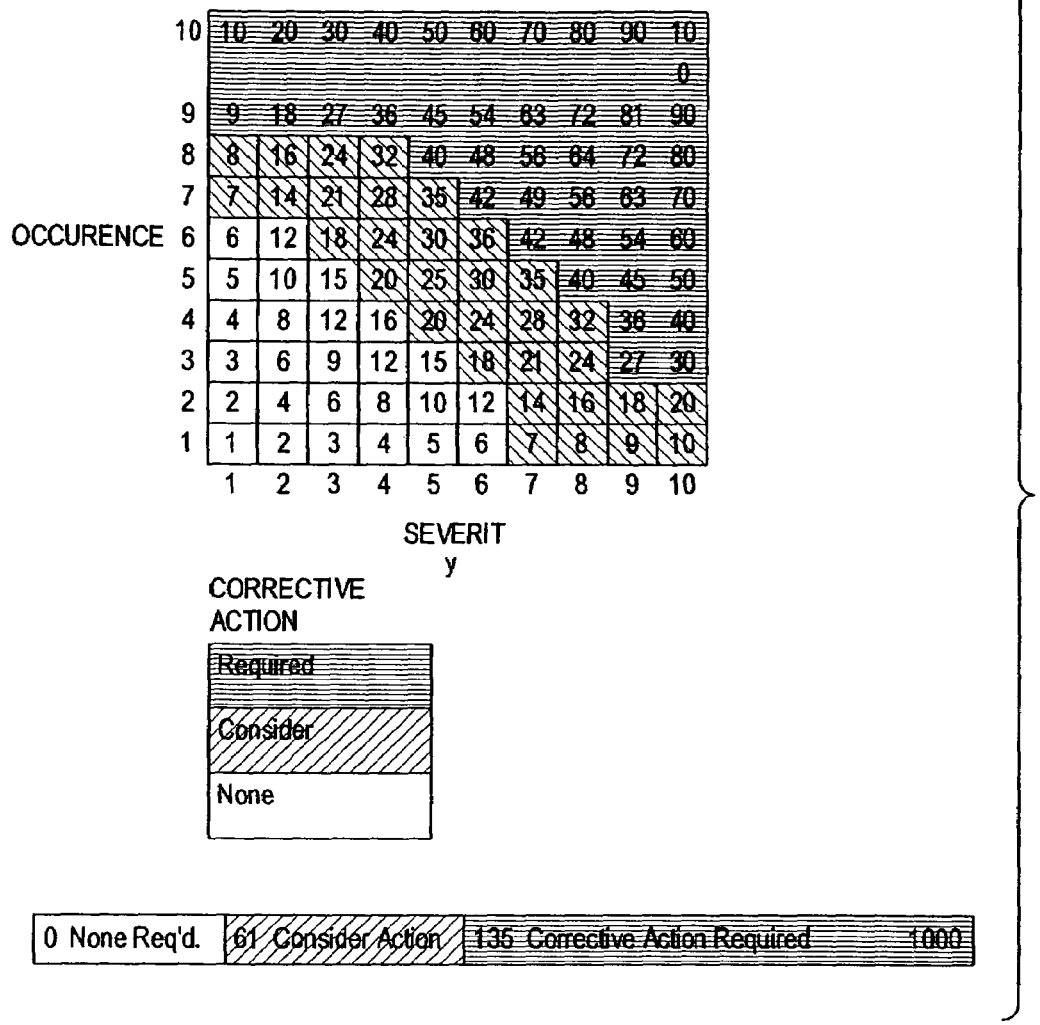
FIG. 6 shows criteria used to determine when the RPN or RPP is triggered.

The criteria to determine where the RPN or RPP is triggered are shown in FIG. 6.

Risk Priority Number:

Straight RPN=<61—"None Required", 61 to 135—"Consider Corrective Action", >135—"Corrective Action Required"

It is important to note that the formulas have to be very carefully designed, as Excel will stop evaluating a logical formula when one of the criteria has been met. The first tests are for failures; the "consider" tests are done after there are no failures. Finally, if the formula does not drop out because of meeting certain conditions it is determined that no corrective action is necessary. This is entered into the recommended action column.

External designations follow the AIAG QS-9000 Manual. The customer will usually use the designations in QS-9000 to identify significant and critical characteristics. The can be identified on drawings, in specifications, or through discussions with customer engineers. The usual designations are CC for a critical characteristic, SC for significant characteristic, and HIC for a high impact characteristic. The template is sensitive to any of these designations being entered into the class column.

The last class designation used is strictly for internal monitoring. This can be used to gather data on a specific part or process in order to determine or verify capability or just because the engineer feels that the characteristic requires careful monitoring. The designation is MVP and stands for "Methode Variable Point". The designation was chosen very carefully to avoid containing the words significant or critical. This designation insures that data is gathered on the part or process. The data may not be reported to the customer (unless specifically requested) as it designed to be used as an internal monitoring trigger.

A new font was developed that contains the symbols used in QS9000 Appendix C. Several customers require that their symbols appear in our documentation. These symbols were developed into a font to allow them to be entered as keystrokes rather than graphics. All other keys remain the same. This will be useful as the Safety Symbols in documents can be treated like text rather than graphics. The font is distributed in a standard format such as TrueType. The installation takes place in the normal way dictated by the operating system being used and will therefore not be described here.

The severity, occurrence, and detection tables come directly from the AIAG FMEA Manual. They have been added into the template for several reasons. The first reason is to make them readily accessible to the personnel generating the documentation. The other reason is to allow customization where internal measurement and evaluation systems use different measurements than the original tables. This insures that any assumptions made in the creation of the documentation are included in the documentation. It allows the core team and customers to see what criteria were used to select the severity, occurrence and detection values used in the FMEA(s).

Figure 7:
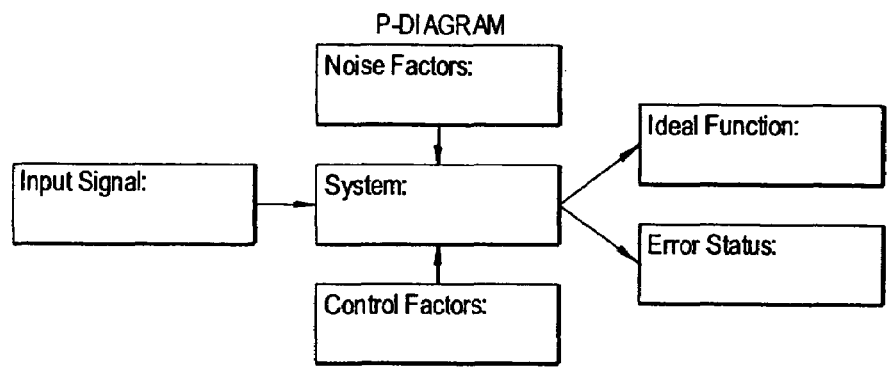
FIG. 7 shows a characteristic sheet.

The characteristic sheet, shown in FIG. 7 as 700, is used as a consolidation point for any significant, critical, internal monitoring, or supplier monitoring characteristics. One of the primary reasons for the development of the template is that significant characteristics could not be tracked through the documentation. The characteristic sheet is that link. The first item to mention is the number specified in the "Minimum Number Required" box 702. This number is generated by the addition of all the monitoring required elements added together from the DFMEA and the PFMEA. The danger here is that one characteristic could show up on both documents. When this happens, the spreadsheet will count the single characteristic twice. The only way around this at this point is to indicate the number of characteristics covered by each line entry in the characteristic sheet. Another potential problem is if a characteristic shows up on the Control Plan but is not included on either FMEA. This is why the number was specified as a minimum. Characteristics that will show up only on the Control Plan should also be entered to facilitate the tracking continuity. This is complimented by the entry by each characteristic as to the source of the characteristic. The characteristic source is selected from a drop down. The drop down is presented by right clicking the mouse in the cell to be filled in and selecting "pick from list". The selections that show up on the list are contained in the hidden rows two through ten. It should be noted that each characteristic is given a number by the form. This number is carried over to the Control Plan with some of the data about the characteristic.

The purpose for this is to:

1. Insure that all significant and critical characteristics are accounted for in the Control Plan.

2. Allow the characteristics to be moved around in the Control Plan to fit the "assembly flow" format of the Control Plan but still be associated with specific characteristic information from the characteristic sheet.

Figure 8:
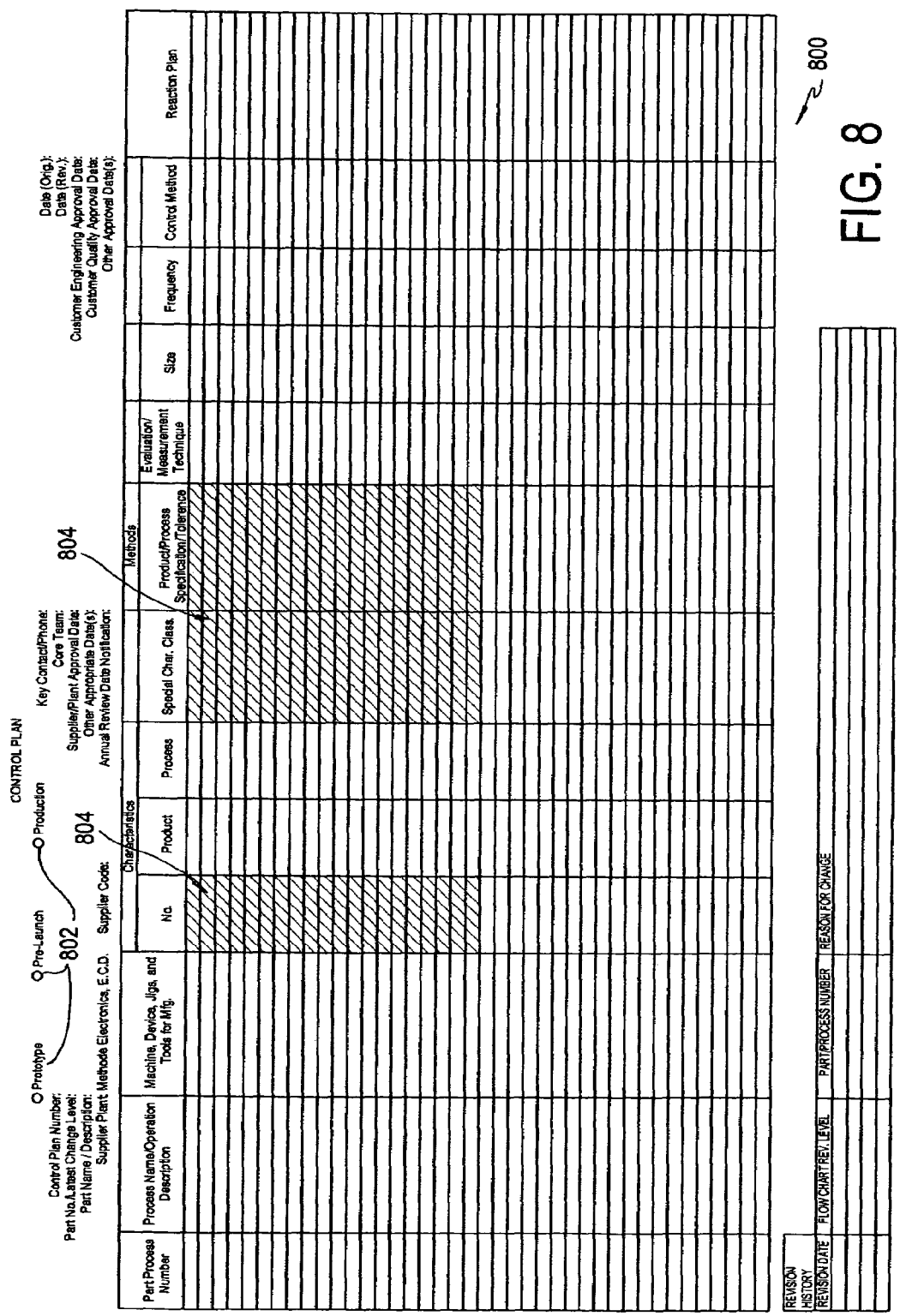
FIG. 8 shows a control plan.

The Control Plan, shown in FIG. 8 as 800, is the element in the control documentation that summarizes all of the previous documentation. It specifies how parts, subassemblies and assemblies will be checked, how often, how recorded, and what will happen if something goes wrong. The format of the Control Plan is not much different from the AIAG form except for the radio buttons 802 that identify the stage and the review date notification field. The next most noticeable feature is the yellow highlighted cells 804 in the body of the text area. Twenty rows have certain cells highlighted. These are the locations where certain information from the Characteristic Sheet will be entered into the Control Plan.

The original Control Plans were created in Word® using a table. Formatting was done using the "enter" key within a table cell. When a file is copied into Excel®, the "enter" keystrokes are interpreted as a command to move to the next cell. This means that before an old control Plan can be copied into the Excel® template the "enter(s)" must be removed. This process is quite easy. The template should be checked before any work is started to insure that the Control Plan will fit into the template. Rows can be added under the yellow section of the text to accommodate the number of lines needed to get the old plan into the template. In the "normal" view, the body of the text is highlighted keeping inside the table outline. The object is to replace the "enter(s)" with nothing. "Edit"—"replace"—"special"—"paragraph mark" and leave the replace with box empty accomplishes this result. This should also leave the text body highlighted. This means that you can immediately select "copy" and switch over to the template. The paste should take place a few rows after the yellow highlighted area. The template is formatted to wrap text so when the paste is done, only the first few words of text will show in each cell. The text is all there and will expand the cell when any formatting is done on the document. The first formatting that should be done is to highlight all the body of the text and "format", "cells", "alignment", "vertical", "top". This will justify all text to the top of the cell. A quick check to see if the paste was successful is to check the right margin. If there are no cells outside the outline of the Control Plan, everything went as it should. If some cells are outside the right margin they can be highlighted and moved back into place (drag and drop) on a row by row or adjacent rows basis.

Figure 9:
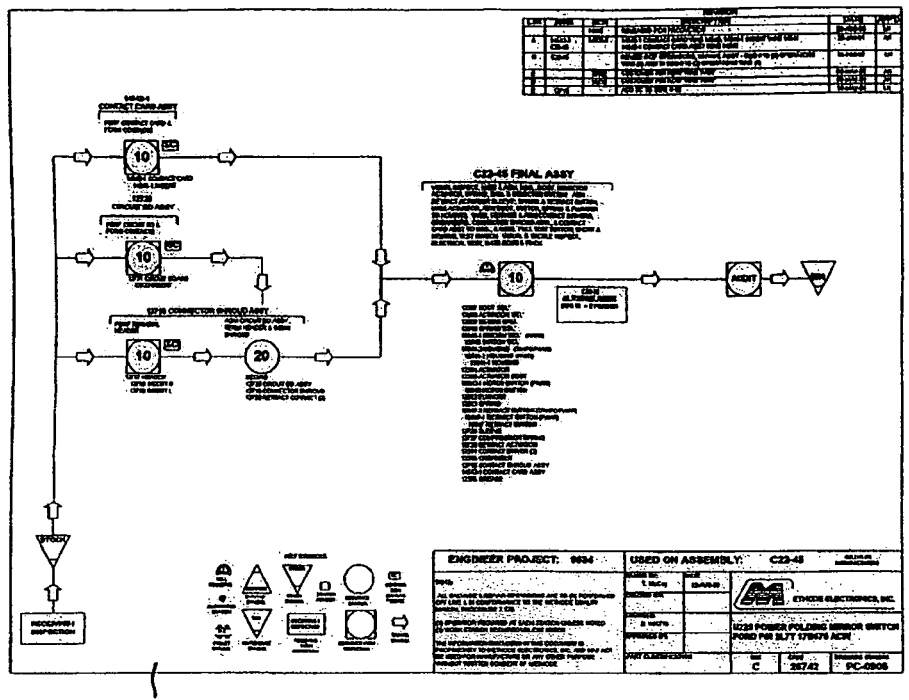
FIG. 9 shows a process flow diagram.

The Process Flow Diagram, shown in FIG. 9 as 900, is generated by the Manufacturing Engineering function. It is the pictorial representation of the process sequence, component parts, fixtures, and operation numbers. The drawing is done using the program VISIO®. Since the Process Flow diagram shown in FIG. 9 covers a specific process and is therefore illustrative rather than limiting.

Initially, the drawing was distributed as hard copy only. This was changed by exporting the file from Visio® in a format that could be viewed on any computer. The decision to include the Process Flow Diagram as part of the Control Document Linking file was a natural one since so many other documents depend on the Diagram. Tests were done to see what formats Visio® could export that Excel® could import yet didn't compromise graphic quality. The format chosen was GIF. This gave the most compatibility with the lowest file size and the highest quality. It must be stated that the Adobe Acrobat file format is smaller still with excellent quality. The problem is that the format is not directly compatible with Excel®. This would mean that the file could not be embedded within the spreadsheet but be linked to it. This caused other problems that outweighed the benefits of the smaller file size. This might be considered as a future enhancement if the files become compatible in the future. The other item that has a bearing on the quality of the image is that the GIF format uses a "clear" background rather than "white". This helps to keep the file size down but made it necessary to "turn off" the grid lines on the spreadsheet so that they would not show through the image. Cells had borders put around them where it was needed. Of course, as file formats are modified, other file formats may be deemed suitable for use in the present invention, and it may become possible that file size can be kept down without the need to turn off the grid lines.

The worksheet has only three components at this point. The part number is automatically brought in from the Scope-Criteria-Checklist page. The image itself is merely pasted in. The Drawing revision level is taken from the drawing and manually entered into the cell below the part number. We have also been adding the part revision level as a suffix to the drawing letter for revision level comparison.

Another optional enhancement is to include the subassembly flow diagrams on the same page as the main process flow. A small table of subassemblies and hyperlinks to cells on the page could cover all related parts.

Work Instructions are also generated in the Manufacturing Engineering section. This is the written translation of the PFC used by the operators in the shop.

The Customer Part Number and supplier Part Numbers are automated. The rest of the document is manual. Initially two templates were included, one for cells and the other for non-cell operations.

Several possible future enhancements are possible here. One might be a standardized form that uses a "radio button" to distinguish between cell and non-cell. A second enhancement might be the automated addition of the safety symbols from the various customers for safety parts. This could be done by reading the information related to safety on the Scope-Criteria-Checklist page and, if conditions meet criteria, insert the safety symbol.

The Packaging Specifications are the last part of the Design Control Document file. This material is also generated by Manufacturing Engineering. It defines the materials and quantities to be used in packaging the product.

The automation covers the supplier Part Number (two locations), and the Customer Part Number. Manual entries are the document dates, revision level and customer release level. The template contains six blank forms for various combinations of packaging.

The following identifies known issues, their causes, and corrective actions.

Keyword: Links

ISSUE: The file brings up a window at startup stating that the file has links to another file—Do you want to update the links?

CAUSE: In some cases; copying an old file into the template will not just bring data but a link.

CORRECTIVE ACTION: The link should reference the same information that was copied in from the old file. It should exist in the new file as data. The source file for the link should be changed to the same file that warned of the link. This is done under EDIT, LINK, Change source file, and identify the file on which you are working. When done correctly, the link in the window disappears. Be sure to save the file to replace the original that has links

KEYWORD: MACRO

ISSUE: The macro does not sort the PFMEA or DFMEA.

CAUSE: Macros were not enabled when the file was opened.

CORRECTIVE ACTION: Save any changes that were made and close the file. Re-open the file and be sure to enable the macros when the dialog box asks.

ISSUE2: The macro runs to the bottom of the spreadsheet and fails.

CAUSE2: The macro has a subroutine that searches for the end of the file. This was done because every file can be a different length. There is a cell in column AA just below the last line in the body of the form that contains the number one. This is the end of file indicator. Column AA is hidden to prevent accidental deletion but the row below the body is not hidden. Accidental deletion of this row (or column) deletes the end of file indicator and the macro searches to the end than the macro fails.

CORRECTIVE ACTION2: Replace the end of file indicator in column AA one row below the last line of the body of the FMEA. Re-run the macro.

ISSUE3: The macro does not copy the entire FMEA to the Sorted FMEA sheet.

CAUSE3: A character or number has been inserted into column AA prior to the end of the text file.

CORRECTIVE ACTION3: Find and remove the character or number. (Unhide the column, press "end" and then the down arrow key. The cursor will stop at the next cell that is different. Delete the offending character—NOT the "1" in the row under the last line of text. Re-hide the column. Re-run the macro.

ISSUE4: The sorted FMEA does not show the colors in the Recommended Action and Responsibility columns like the original FMEA data sheet.

CAUSE4: The macro was run while the shared file option was turned on. Graphics are not editable while file sharing is enabled.

CORRECTIVE ACTION4: Turn off the file sharing option under Tools—Share Workbook. Run the macro. Turn file sharing back on. Note: There can be no other users when file sharing is turned off. Concurrent users will show up under the Share workbook tab.

KEYWORD: COLUMNS

ISSUE: When a file is copied into the template, the columns do not match the original file.

CAUSE: Hidden columns in the template are filled in by a paste operation although the data cannot be seen.

CORRECTIVE ACTION: The attempt to copy has overwritten formulas in the hidden columns. This copy of the template is no good to use any more. Start with a new copy of the template and follow the instructions carefully as set forth above for importing an existing FMEA.

KEYWORD: FONT GARBLED

ISSUE: Copying in an old file gave a garbled message where the Customer Spec Number shows up.

CAUSE: The computer that you are working on does not have the NewSymbolFont installed on it.

CORRECTIVE ACTION: Install the NewSymbolFont (FMEA Font) per the instructions for the operating system being used.

Other actions will be added as they are found.

The template was designed from the beginning to be a tool that enhances the job of the Core Team to develop the required design documentation for a product. Balance was key in allowing the functional experts to develop their input within their functional environment then share it with the Core Team for review and additional input.

The old way of doing business was to have the functional area generate the appropriate document and publish it. This "over-the-wall" approach did not promote the desired cooperation, communication, and consensus. It limited the exposure of the generating function to the real problems and issues that the products were seeing. The cross-functional team approach brings all this information together in one place for the team to address. Tools are being put into place that will allow the measurement and quantification of issues internally and externally for prioritized resolution. The entire system is depicted in the diagram that follows the introduction. It is shown under the heading of the Control Document Linking System but it is much, much more. The overall system is a closed loop, feedback and control. Proper utilization and understanding of the tools forces continuous improvement by prioritizing the largest problems until they are resolved—permanently.

The system being used to generate the documents usually starts in Design Engineering. They are usually the first to be made aware of new products being developed or existing products being changed. The notification system (ECN) is used to identify the details of the changes. The Control Document Linking System is used to implement the changes. A secure directory is established on a network drive. The directory is called Design Control Documents. There are several sub-directories. Launch, Obsolete, Production, Prototype, and Service describe where the product is in its life cycle. In Process is used to store documents that are being built. A system is being set up where when one function completes their portion of the file; they move it to the next functions folder within In Process. All users are notified by e-mail that the file is being revised.

Figure 10:
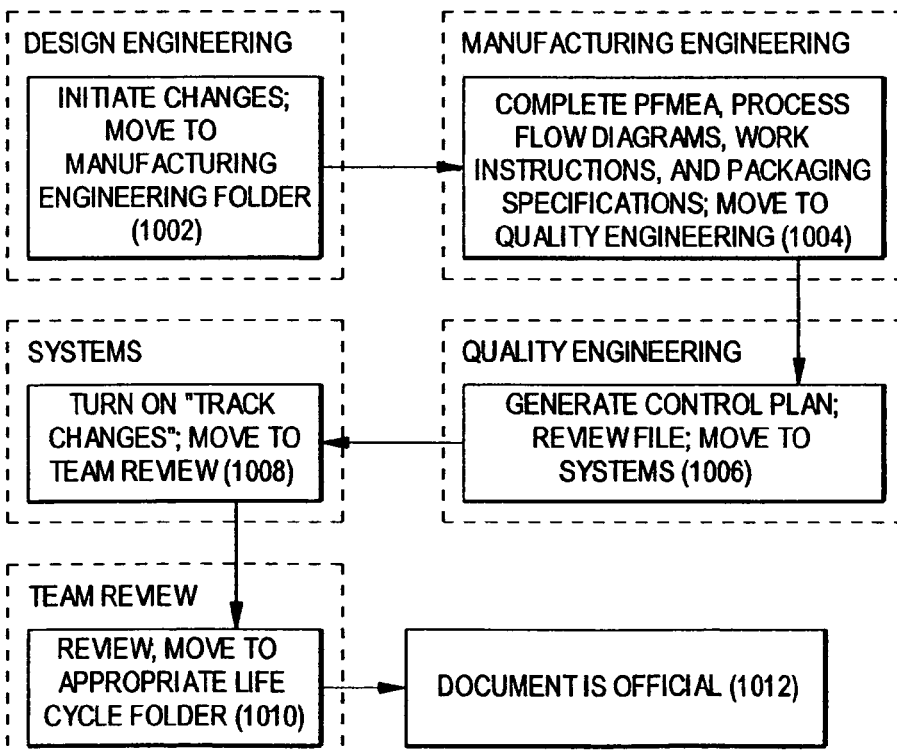
FIG. 10 shows a flow chart of the process for producing the control documents.

A detailed description of the process will be presented with reference to FIG. 10. Design Engineering usually initiates the changes (step 1002). When their portion is complete, they would move the file to the Manufacturing Engineering folder. Manufacturing Engineering would complete the PFMEA, Process Flow Diagram, Work Instructions, and Packaging Specifications and move the file to the Quality Engineering folder (step 1004). Quality Engineering generates the Control Plan, reviews the file, and moves it to the Systems folder (step 1006). Systems "turns on" track changes and moves the file to the Team Review folder (step 1008). When the team review is complete, a member of the Core Team (or designee) moves the file to the appropriate life cycle folder (step 1010). When this happens, the document is official (step 1012).

While a preferred embodiment has been set forth in detail above, those skilled in the art who have reviewed the present disclosure will readily appreciate that other embodiments can be realized within the scope of the present invention. For example, disclosures of file formats and numerical values are illustrative rather than limiting, as is the order of worksheet pages shown in the template. Also, pages can be split or consolidated. Therefore, the present invention should be construed as limited only by the appended claims.

We claim:

1. A control document template for developing and consolidating control documents associated with a new or revised product, the control document template comprising:

(a) a computer-readable storage medium; and
(b) a spreadsheet file stored in the computer-readable storage medium, the spreadsheet file comprising:
(i) a scope-criteria-checklist page for receiving an input from a user of a list of parts of the product, a risk assessment for each of the parts, and an indication of whether each of the parts is to be included in a failure mode effects analysis;
(ii) a design failure mode effects analysis page for specifying ways in which design of the product can contribute to failure of the product, the design failure mode effects analysis page comprising links to the scope-criteria-checklist page for automatic population of information from the scope-criteria-checklist page into the design failure mode effects analysis page; and
(iii) a process failure mode effects analysis page for specifying ways in which a manufacturing process can contribute to failure of the product, the process failure mode effects analysis page comprising links to the scope-criteria-checklist page for automatic population of information from the scope-criteria-checklist page into the process failure mode effects analysis page.

2. The control document template of claim 1, wherein the spreadsheet file further comprises a control plan page for summarizing information in the spreadsheet.

3. The control document template of claim 2, wherein the spreadsheet file further comprises a characteristic sheet providing links among the design failure mode effects analysis page, the process failure mode effects analysis page and the control plan page, the characteristic sheet showing characteristics of the product and identifying a source of each of the characteristics.

4. The control document template of claim 3, wherein the characteristic sheet shows a symbol identifying each of the characteristics.

5. The control document template of claim 4, wherein the computer-readable medium also has stored thereon a font for display of the symbols.

6. The control document template of claim 4, wherein the characteristic sheet displays a dimension and tolerance for each of the characteristics.

7. The control document template of claim 1, wherein the spreadsheet file further comprises drawing tools to permit the user to draw a process flow diagram for the product.

8. The control document template of claim 1, wherein the spreadsheet file further comprises a severity-occurrence-detection table setting forth a standard for evaluation of the product for entry of the information concerning the product.

9. The control document template of claim 8, wherein the severity-occurrence-detection table includes, for each of the parts, a risk priority number identifying a risk priority of the part.

10. The control document template of claim 9, wherein the risk priority number for each part is a product of values indicating severity, occurrence, and detection of failures of the part.

11. The control document template of claim 10, wherein the spreadsheet file further comprises a macro for sorting each of the design failure mode effects analysis page and the process failure mode effects analysis page by the risk priority numbers.

12. The control document template of claim 11, wherein the spreadsheet file further comprises pages, separate from the design failure mode effects analysis page and the process failure mode effects analysis page, for storing sorting results produced by the macro.

13. The control document template of claim 12, wherein the macro provides, in the sorting results, an indication of a position of each of the parts in the design failure mode effects analysis page or the process failure mode effects analysis page.

* * * * *